United States Patent [19]

Ferree et al.

[11] 3,914,840
[45] Oct. 28, 1975

[54] CUTTING APPARATUS

[75] Inventors: Allen B. Ferree, Ferndale; Gene H. Whitfield, West Bloomfield, both of Mich.

[73] Assignee: Carmet Company, Pittsburgh, Pa.

[22] Filed: Nov. 8, 1974

[21] Appl. No.: 521,993

[52] U.S. Cl. .............................. 29/95.1; 29/105 R
[51] Int. Cl.² ..................... B26D 1/04; B26D 1/12
[58] Field of Search ....... 29/95.1, 96, 105 R, 105 A, 29/97

[56] References Cited
UNITED STATES PATENTS

| | | | |
|---|---|---|---|
| 3,309,758 | 3/1967 | Williams | 29/105 R |
| 3,371,397 | 3/1968 | Coleshill et al. | 29/105 R |
| 3,405,433 | 10/1968 | Williams | 29/105 R |
| 3,656,220 | 4/1972 | Dupuis | 29/95.1 |

Primary Examiner—Harrison L. Hinson
Attorney, Agent, or Firm—Vincent G. Gioia; Robert F. Dropkin

[57] ABSTRACT

Cutting apparatus such as broaching, turning and milling machines includes a reversible cutting tool having a bore therethrough. The tool is mounted on a tool holder having a locating post projecting from its front end into the tool bore. A screw passing through the tool holder intermediate its ends into a cutting block applies a force holding the parts assembled. A projection on the front end of the tool holder bears against an inwardly extending shoulder on the cutting block which may be provided by a groove in the block. The outer block surface and the bottom surface of the tool holder between the rear contact surfaces thereof and the shoulder are so shaped as to provide clearance therebetween. There is only frictional contact between the bottom surface at the rear end of the holder and the outer surface of the block.

14 Claims, 5 Drawing Figures 3,914,840

CUTTING APPARATUS

This invention relates to a cutting apparatus and more particularly to apparatus for supporting reversible cutting tools. Such apparatus may be used in broaching, milling, turning or the like. In particular it is an improvement on the apparatus shown in Dupuis U.S. Pat. No. 3,656,220 dated Apr. 18, 1972. The apparatus shown therein has been and is in successful use. However, its construction is such that considerable machining is required and the tool holder is relatively long thus increasing its weight and limiting the number of tools which can be mounted on a tool block. We have found that the weight and overall length of the tool holder can be decreased by eliminating the rear abutment and providing an abutment at the front end. This requires less machining and the apparatus functions at least as well as the patented apparatus while permitting application of the invention to a wider range of tools. This design also permits reduction in size and weight of the tool block.

It is therefore an object of our invention to provide cutting tool mounting apparatus which is cheaper to manufacture and has wider applications than those of the prior art.

These and other objects will be more apparent after referring to the following specification and attached drawings in which FIG. 1 is a view, partly in section, of a broaching block having two cutter holders and cutters mounted thereon;

Figure 1:
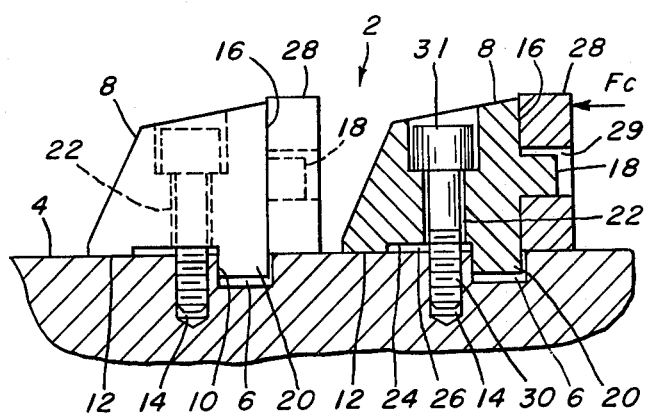

Referring more particularly to FIG. 1 of the drawings, reference numeral 2 refers to the cutting block of a broaching machine such as that shown in the above-mentioned Dupuis patent. The cutting block 2 has a flat outer surface 4 with a plurality of grooves 6 therein, one for each tool holder 8. Each groove 6 forms an inwardly extending shoulder 10. Each tool holder 8 has a bottom surface 12 at its rear end conforming to surface 4. While each of the surfaces 4 and 12 is normally in a single transverse plane it will be understood that they may be transversely arcuate or other shape as long as they match one another so that there is a frictional force therebetween. A threaded hole 14 is provided in block 2. The holder 8 has a flat front face 16 with a locating post 18 projecting forwardly therefrom and a projection 20 on its front end extending into the associated groove 6. A counter bored hole 22 is provided through said holder 8 in line with hole 14. The bottom of holder 8 is cut away at 24 between surface 12 and projection 20 so as to provide clearance 26 between the block and holder from the rear contact surface 12 to projection 20. A reversible cutting tool 28 of any desired shape such as square as shown in the Dupuis patent is provided with an axial hole 29 therein for receiving post 18.

In operation, the cutting tool 28 is placed on post 18 and a screw 30 having a head 31 is passed through hole 22 and threaded into hole 14 with the bottom of head 31 bearing against the bottom of the counterbored shoulder of hole 22 until the bottom of tool 28 bears against surface 4. In this position, as shown, the rear end of projection 20 bears against the shoulder 10 preferably with a little clearance between the bottom of the slot 6 and projection 20. It will be seen that the screw 32 provides a holding force for holder 8 between the front and rear ends thereof with a frictional resisting force between surfaces 4 and 12. The cutting force Fc provided at the top of cutter 28 is balanced by the contact of shoulder 10 and projection 20.

Figure 2:
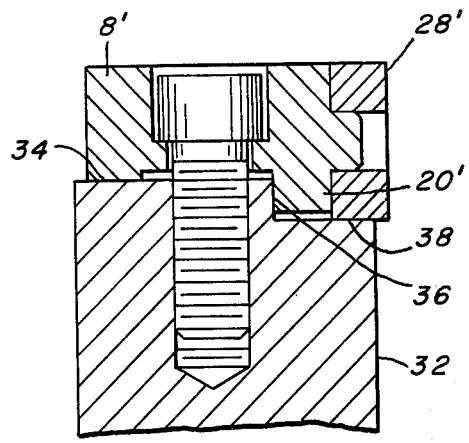
FIG. 2 is a sectional view of a second embodiment of our invention used with a turning tool.

In the embodiment of FIG. 2 a tool holder 8' is mounted at the end of a turning tool block 32. The end of block 32 is provided with a flat outer surface 34, an inwardly extending shoulder 36 and a surface 38 extending from the bottom of shoulder 36. The holder 8' is essentially the same as holder 8 except as modified for its different function and its specific outer contour which has nothing to do with its operation. Also, because there is no groove, the overall height of the holder including projection 20' is substantially the same as that of cutter 28'. The holding and resisting forces are essentially the same as in the first embodiment.

Figure 3:
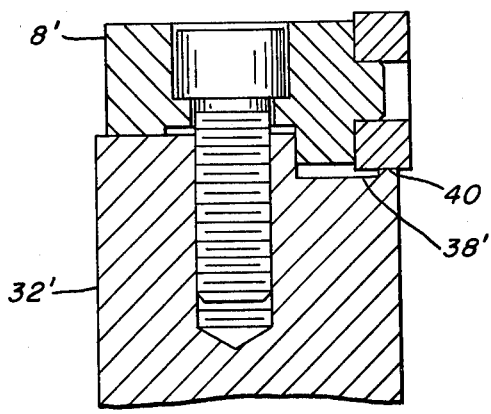
FIG. 3 is a view, similar to FIG. 2, showing a slight different species.

The embodiment of FIG. 3 is essentially the same as that of FIG. 2. The only difference is that an outward projection 40 is provided from surface 38' of block 32' so as to give clearance to protect that cutting edge of the tool not in use.

Figure 4:
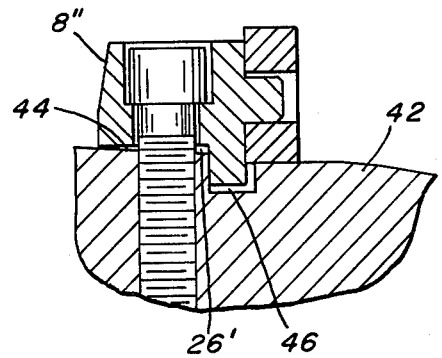
FIG. 4 is a sectional view of still another embodiment of our invention.

The embodiment of FIG. 4 includes a tool block 42 having an outer surface 44 which slants inwardly to a groove 46. Tool holder 8'' is similar to the other holders except that its bottom surface is not cut away as at 24, but clearance 26' is provided by reason of the sloping surface 44 which is arranged at an angle to the bottom surface of holder 8'' at this location. The operation of this embodiment is essentially the same as the others.

Figure 5:
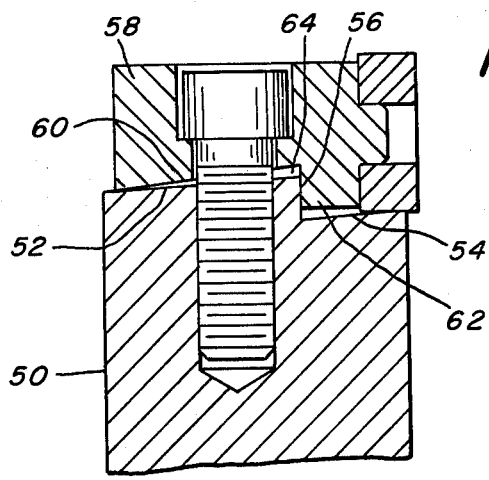
FIG. 5 is a sectional view of a further embodiment of our invention.

In the embodiment of FIG. 5, the end surface of a turning tool block 50 is provided with outwardly sloping surfaces 52 and 54 connected by a shoulder 56. The surfaces 52 and 54 are parallel except for a cutter receiver portion at the end of surface 54 which is normal to the longitudinal axis of block 50. Holder 58 has an inner rear surface 60 at its rear which slopes outwardly to projection 62 at a greater angle than surface 52 so as to provide clearance 64. The construction and operation are otherwise basically the same as the other embodiments.

It will be seen that the holder when used with a milling cutter or machines having a bar type block permits blocks of relatively small cross-section to be used because of the reduced length of the tool holder. It will be understood that each embodiment of my invention may be used in other types of tools.

While several embodiments of the invention have been shown it will be apparent to those skilled in the art that the novel principles disclosed herein will suggest various other modifications and applications of the same. It is accordingly desired that in construing the breadth of the appended claims they shall not be limited to the specific examples of the invention described herein.

We claim:

1. Cutting apparatus comprising a cutting block, a reversible cutting tool having a bore extending therethrough, a tool holder for said cutting tool superimposed on the outer surface of said cutting block and projecting therefrom, a locating post projecting forwardly from the front end of said tool holder into said bore in the cutting tool for positioning the tool on said holder at an inclination to said outer surface, means detachably securing said tool holder to said tool block, said means applying a holding force at a location between the front and rear ends of said tool holder, said outer block surface and the surface of said tool holder being in only frictional contact at the rear end of said tool holder, an inwardly extending shoulder on said cutting block between the front end of said tool holder and the location of said holding force, and a projection on the front end of said tool holder bearing against said shoulder, said outer block surface and the surface of said tool holder between the rear contact surfaces thereof and said shoulder being so shaped as to provide clearance therebetween.

2. Cutting apparatus according to claim 1 in which said holding force means includes a threaded hole in said cutting block, an counterbored hole in said tool holder in axial alignment with said threaded hole, said counterbored hole providing a shoulder, and a screw having a head thereon, said screw extending through said aligned holes with the screw head bearing against the shoulder in said counterbored hole.

3. Cutting apparatus according to claim 1 in which said holder includes a cutaway portion on its bottom between its contacting rear surface and the rear end of said projection to provide said clearance.

4. Cutting apparatus according to claim 3 in which said holding force means includes a threaded hole in said cutting block, a counterbored hole in said tool holder in axial alignment with said threaded hole, said counterbored hole providing a shoulder, and a screw having a head thereon, said screw extending through said aligned holes with the screw head bearing against the shoulder in said counterbored hole.

5. Cutting apparatus according to claim 3 in which said inwardly extending shoulder is provided by a groove in said cutting block of such size as to receive said projection, said cutter resting on said outer surface of said cutter block forward of said groove.

6. Cutting apparatus according to claim 5 in which said holding force means includes a threaded hole in said cutting block, a counterbored hole in said tool holder in axial alignment with said threaded hole, said counterbored hole providing a shoulder, and a screw having a head thereon, said screw extending through said aligned holes with the screw head bearing against the shoulder in said counterbored hole.

7. Cutting apparatus according to claim 3 in which said inwardly extending shoulder is provided by a recess in said cutting block extending from said inwardly extending shoulder forwardly to the end of said cutting block, said cutter resting on the bottom of said recess.

8. Cutting apparatus according to claim 7 in which said holding force means includes a threaded hole in said cutting block, a counterbored hole in said tool holder in axial alignment with said threaded hole, said counterbored hole providing a shoulder, and a screw having a head thereon, said screw extending through said aligned holes with the screw head bearing against the shoulder in said counterbored hole.

9. Cutting apparatus according to claim 1 in which the bottom of said holder between its rear end and projection is arranged at a different angle than the opposing outer surface of said tool block to provide said clearance.

10. Cutting apparatus according to claim 9 in which said holding force means includes a threaded hole in said cutting block, a counterbored hole in said tool holder in axial alignment with said threaded hole, said counterbored hole providing a shoulder, and a screw having a head thereon, said screw extending through said aligned holes with the screw head bearing against the shoulder in said counterbored hole.

11. Cutting apparatus according to claim 9 in which said inwardly extending shoulder is provided by a groove in said cutting block of such size as to receive said projection, said cutter resting on said outer surface of said cutter block forward of said groove.

12. Cutting apparatus according to claim 11 in which said holding force means include a threaded hole in said cutting block, a counterbored hole in said tool holder in axial alignment with said threaded hole, said counterbored hole providing a shoulder, and a screw having a head thereon, said screw extending through said aligned holes with the screw head bearing against the shoulder in said counterbored hole.

13. Cutting apparatus according to claim 9 in which said inwardly extending shoulder is provided by a recess in said cutting block extending from said inwardly extending shoulder forwardly to the end of said cutting block, said cutter resting on the bottom of said recess.

14. Cutting apparatus according to claim 13 in which said holding force means includes a threaded hole in said cutting block, a counterbored hole in said tool holder in axial alignment with said threaded hole, said counterbored hole providing a shoulder, and a screw having a head thereon, said screw extending through said aligned holes with the screw head bearing against the shoulder in said counterbored hole.

* * * * *